US008978226B2

(12) United States Patent
Kady et al.

(10) Patent No.: US 8,978,226 B2
(45) Date of Patent: Mar. 17, 2015

(54) HAND TOOL FOR USE IN THE QUICK DISCONNECTION OF QUICK CONNECT/DISCONNECT COUPLINGS

(75) Inventors: Darren Kady, Oakapie, SC (US); David Lee Showalter, Barbouseville, VA (US)

(73) Assignee: Direct Source International, LLC, Hardeeville, SC (US)

( * ) Notice: Subject to any disclaimer, the term of this patent is extended or adjusted under 35 U.S.C. 154(b) by 240 days.

(21) Appl. No.: 13/493,140

(22) Filed: Jun. 11, 2012

(65) Prior Publication Data

US 2013/0326854 A1 Dec. 12, 2013

(51) Int. Cl.
*B23P 19/00* (2006.01)
*B23P 19/04* (2006.01)
*B25B 7/22* (2006.01)
*B25B 7/02* (2006.01)

(52) U.S. Cl.
USPC ................ 29/426.5; 29/237; 29/268; 29/239; 29/426.1; 7/125; 81/423

(58) Field of Classification Search
CPC ...... B25B 5/068; B25B 25/005; B25B 27/10; B25B 7/04; B25B 7/02; F16L 1/09
USPC ................ 29/237, 239, 268, 234, 272, 426.5, 29/426.1, 426.6; 81/9.3, 426, 486, 423; 7/125
See application file for complete search history.

(56) References Cited

U.S. PATENT DOCUMENTS 2,523,936 A 9/1950 Axelsen
3,845,538 A 11/1974 Demler, Sr.
4,174,560 A 11/1979 Senior et al.
4,257,135 A * 3/1981 Moebius .......................... 7/125
4,416,045 A 11/1983 Staten
4,475,418 A 10/1984 Tani
4,571,808 A * 2/1986 King .............................. 29/268
4,785,694 A 11/1988 Burmester
4,926,722 A 5/1990 Sorensen et al.
4,951,529 A 8/1990 Laurencot
5,009,134 A 4/1991 Sorensen et al.
5,022,137 A 6/1991 Sorensen et al.
5,222,420 A 6/1993 Sorensen et al.
5,671,520 A * 9/1997 Scarborough .................. 29/237
5,845,393 A 12/1998 DePaiva
5,979,032 A * 11/1999 Roy et al. ........................ 29/237
6,314,629 B1 * 11/2001 Showalter et al. ............. 29/237
6,378,909 B1 * 4/2002 Rogers et al. .................. 285/39
6,941,626 B2 * 9/2005 Johnson et al. ................ 29/237
6,966,104 B2 * 11/2005 Gregel et al. .................. 29/280
8,161,845 B2 4/2012 Idir
8,191,638 B2 6/2012 Tjader
8,341,816 B1 * 1/2013 Swinford ........................ 29/237
2008/0314205 A1 12/2008 Feliciano
2010/0071514 A1 3/2010 Idir

FOREIGN PATENT DOCUMENTS

CA 2374873 A1 * 11/2000 .............. F16L 35/00

* cited by examiner

*Primary Examiner* — Essama Omgba
(74) *Attorney, Agent, or Firm* — Sheldon H. Parker, Esq.

(57) ABSTRACT

A tool for the removal of connectors from pipes is disclosed that, in one embodiment, enables the removal of connectors from large pipes and in another embodiment from a size range of pipes. Movable and stationary gripping and pushing elements are affixed to handles to enable a pipe to be firmly gripped between a movable gripping jaw and a stationary gripping jaw and the connector prevented from movement by the movable pusher jaw and the stationary pusher jaw. The handles can compress around a pivot point or slide on a bar. In another embodiment the movable and stationary gripping and pushing elements are removable from the body of the tool.

42 Claims, 15 Drawing Sheets

HAND TOOL FOR USE IN THE QUICK DISCONNECTION OF QUICK CONNECT/DISCONNECT COUPLINGS

FIELD OF THE INVENTION

The invention relates to a hand tool, and more particularly, a hand tool for use in the quick disconnect of a quick connect/disconnect coupling.

BACKGROUND OF THE INVENTION

Quick connect/disconnect couplings are commonly used to connect pipes and tubing in many fields from automobiles and trucks to waterlines. Although easy to connect, the disconnection requires that the release ring on the connector be recessed simultaneously with the removal of the conduit in the opposite direction. This can be a problem when the connectors are placed in inaccessible areas.

Although many devices have been patented for stripping the ends of electrical wires, such as U.S. Pat. No. 4,951,529, to Andre Laurencot; and U.S. Pat. No. 4,475,418 to Isamu Tani none have addressed the issue of removing a quick connector from a conduit. U.S. Pat. No. 6,314,629 to Darren Kady, disclosed a tool for the easy removal of quick disconnect connectors from conduits however these tools are unable to handle over five eights (⅝") and above diameters. Also, they are unable to handle many of the new slim line style quick connect/disconnect couplings for the plumbing industry.

The disclosed hand tool grasps and moves the conduit in the opposite direction from the release ring on the connector, easily removing the large connectors from the conduit.

SUMMARY OF THE INVENTION

A tool for the removal of connectors from pipes is disclosed that, in one embodiment, enables the removal of connectors from large pipes and in another embodiment from a size range of pipes. The body of the tool has a body divided into a gripping portion, having a first and second end, and a pusher portion, having a first and a second end. A pair of handles, a first connected to the second end of the gripping portion and a second to the second end of the pusher portion. In some embodiments the second handle, and connected pusher element, is stationary, while in others both handles, as well as the pusher and gripper elements, are movable.

At the first end of the gripping portion is the gripping element which consists of an arced movable gripping jaw and an optionally arced stationary gripping jaw. Both the stationary gripping jaw and the movable gripping jaw have gripping surfaces that are parallel to the circumference of the pipe. The gripping surface of the movable gripping jaw, and optionally the stationary gripping jaw, preferably have surfaces that have been roughened by at least one of undulations, pointed rows, multiple randomly placed pyramids, pointed columns, natural or synthetic coatings. The movable gripping jaw is connected to a linkage, connecting the jaw to the first handle.

In some embodiments the gripping portion and pusher portion are connected through a pivot connection for rotatability. A spring connected to the handles maintains the handles at a maximum separation distance thereby maintaining the first ends of the gripping portion and pusher portion adjacent one another.

The pusher portion has at its first end a pusher element that consists of an arced stationary pusher jaw and arced movable pusher jaw. Both the stationary pusher jaw and the movable pusher jaw have holding surfaces that are flat and parallel to the circumference of the pipe. The outer face surface of both the stationary pusher jaw and the movable pusher jaw are on the same plane in order to contact the connector ring, or connector, evenly and simultaneously. The holding surface of the stationary pusher jaw is on the same plane with the stationary gripper jaw to prevent angling of the pipe during connector removal. To facilitate removal of the movable pusher jaw from the pipe, the tip of the pusher jaw is preferably angled with respect to the pipe. The angle should be such that the pipe does not catch on the edge of the tip.

The holding surface and the gripping surface have a hardness greater than the hardness of said pipe.

To limit the rotation of the movable pusher jaw a stop a-step is used with a spring being used between the rotating pusher jaw and the pusher portion to return the rotating pusher jaw to a closed position. The connection point between the movable pusher jaw and the pusher element is dimensioned to avoid contact with the connector sealing ring and ensure even pressure is applied.

In the tool designed for a range of smaller size pipes, from ⅛ to ⅜, the arced holding surface of said movable pusher jaw is dimensioned to have at least 10% of the arced holding surface in contact with the pipe adjacent to the connector. Similarly, the arced gripping surface of said movable gripping jaw is dimensioned to have at least 10% of its gripping surface in contact with the pipe.

When the handles are initially compressed, the movable pusher jaw and movable gripper jaw clamp the pipe between the movable jaws and the stationary jaws. Further compression of the handles causes the gripping element to move away from the pusher element.

An example linkage is an E plate secured within the gripping portion to slide upon compression of the handles. The first end of the E plate receives a gripper tab at one end of the movable gripper jaw and a second end of said E plate receives a connector to the first handle. A guide member, such as a roller or tab, affixed to the gripping portion prevents the E plate from twisting.

In the tool that removes connectors from the large pipes, one inch and above, it is preferable to have a release mechanism on the movable gripper jaw. The release mechanism interacts with a release mechanism receiving area to release the movable gripper jaw from a closed position and relock the jaw in the closed position. An example release mechanism would consist of a release button, a release block and a spring to maintain the release block in a position to lock the movable gripper jaw. Movement of the release button compresses the spring and releases the movable gripper jaw to the open position.

On the tool for larger pipes the arced holding surface of the movable pusher jaw has a width in the range of about 27 mm to about 30.5 mm and preferably in the range of 28 mm to 29.5 mm and a depth in the range of about 13.5 mm to about 16.5 mm and preferably in the range of 14.5 mm to 15.5 mm. The arced gripping surface of the movable gripping jaw has a width in the range of about 20 mm to about 23 mm and preferably in the range of 21.5 mm to 22.5 mm and a depth in the range of about 2 mm to about 6 mm and preferably in the range of about 4 mm. In this size tool at least 23% of the arced gripping surface of the movable pusher jaw and the arced holding surface of the movable gripper jaw contact said pipe.

In some embodiments the gripping portion and the pusher portion can be connected by a bar with at least the gripping portion movable along the bar. The tool can further comprise a bar connection, the bar connection maintaining the gripping portion and said pusher portion slidably connected. In this embodiment at least one of the handles has a compression member to move one handle toward the other along the bar connection and a release member to move the handle away from the other handle.

In an additional embodiment, the pusher and/or gripper portions have a receiving area in the first end that includes a securing member to secure removable pusher and/or gripper elements.

BRIEF DESCRIPTION OF THE DRAWINGS

The advantages of the instant disclosure will become more apparent when read with the specification and the drawings, wherein.

DETAILED DESCRIPTION OF THE INVENTION

Figure 2:
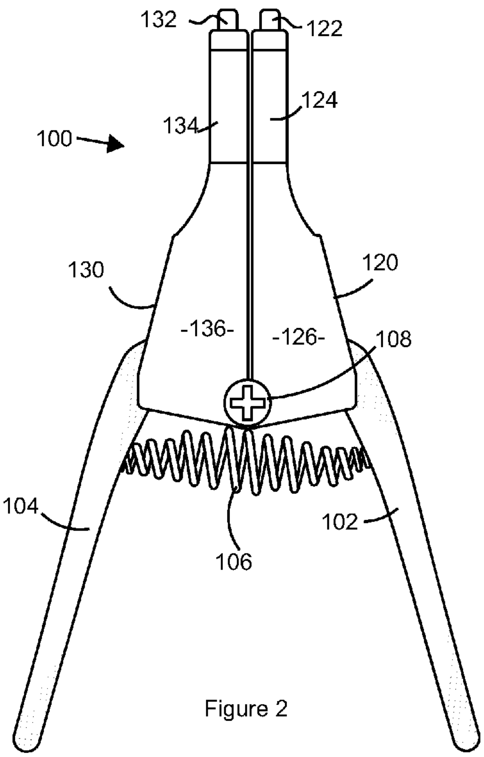
FIG. 2 is a back view of the quick release tool in accordance with the present invention.

The disclosed hand tool is used to remove couplings from tubing, piping or other conduits. These quick connect/disconnect couplings are commercially used to connect tubing in all areas of industry, where the tubing is for air, chemicals or liquids. The structure, method of operation, and methods of connecting to various conduit materials, is well known in the art. The quick connect/disconnect coupling maintains the two conduits securely, and in fluid, and/or air, tight engagement with one another. The fluid can be a liquid such as water, oil, a combustion fuel such as gasoline, or a gas such as air, natural gas, propane, hydraulic fluids or the like. In the manual embodiment, the handle members are hand actuated and through a linkage, such as described in the U.S. Pat. Nos. 4,951,529, 4,475,418 and 2,523,936, actuate the gripping and release members. The tool can be built on the framework of wire strippers, such as disclosed in U.S. Pat. No. 4,951,529, 4,475,418 or 2,523,936, the disclosures of each patent being incorporated herein by reference, as though recited in full.

DEFINITIONS

The phrase "maximum separation distance" as used herein means the fully open position at which the pair of handles are maintained by some form of spring means. At the maximum separation distance the gripping portion first end and the pusher portion first end are maintained adjacent to each other.

The term "arc" as used herein refers to the peripheral contour of a component which is a part of a circle or other curved line, such as an oval.

The term "spring" as used herein means an elastic contrivance or body, as a strip or wire of steel that recovers its shape after being compressed, as for example a leaf spring and a coil spring.

Quick release couplings are made for easy removal, and have expanded from the smaller size hones to larger diameter pipes, such as PVC, Pex, copper and conduits. As the diameter of the pipe increases, so does the difficulty in grasping the pipe and releasing the connector. Further, these larger couplings are frequently used in tight spaces, such as under sinks and within large equipment. The disclosed device enables a user to reach into tight spaces, grip the tubing, and separate the coupling with an easy to use hand tool.

The material of manufacture of the gripping tool should be steel or other durable material as there is a substantial amount of stress placed on the parts. Of specific issue is the movable gripper jaw as the teeth that actually grip the pipe to be removed are formed from this jaw. In order to grip the pipe, the material forming teeth and ridges must be harder that the material being gripped. The determination of the hardness of the materials needed for manufacture for use on a specific material can be through any of the known hardness testing methods. For example, copper pipe will range between 8.0 and 12.0 HS on the Schore's Scleroscope scale and can easily be gripped by any steel used for the tool manufacture. However, if steel pipes are used, the hardness of the tool must exceed the hardness of the pipe. In most applications a D2, heat treated iron alloy metal, such as an amorphous metal, zinc alloy or stainless steel with the appropriate heat treatment process can be used. For materials that are more difficult to grip and therefore prone to slippage, such as copper pipes, a hardened steel 440 heat treated to the heat spec of 50RWC or equivalent provides optimum results. Further, the greater the tension created by the compression spring 112, as noted herein, the faster the contact with the pipe and the greater the gripping pressure prior to separating. The choice of the appropriate metal for the end use will be evident to those skilled in the art.

In all embodiments herein the surfaces of the jaws contacting the pipe must be on the same plane in order for the entire curvature of the jaw to contact the surface of the pipe with equal pressure. The washers used on the conduits has a thickness of about 1⁄16 of an inch and any areas of uneven contact between the pipe and the jaw can result in increased difficulty in removing the connector or failure to remove pipe from the coupling.

In all designs the arc of movement of the gripper jaws and pusher jaws needs to be on the same plane, thereby causing the two stationary jaws and the two movable jaws to contact the pipe simultaneously. This is especially important on the tool removing the ¾ inch and the 1 inch pipe, however the performance of all sized tools can be affected.

The outer and inner surface of the stationary and movable jaws should be on the same plane in all embodiments. In other words, the outer surface of the movable gripper jaw must be flush, or on the same plane, with the outer surface of the stationary gripper jaw. In turn the inner surface of the stationary gripper (side with teeth) must be on the same plane with the inner surface of the stationary pusher in order not to cause a ratcheting effect of the pipe or conduit. This ratcheting effect will cause the pusher to override the release ring of the coupling resulting in failure to disconnect. The inner surface of the movable and stationary gripper jaws must also be flush with one another, as are the pusher jaws. This enables even pressure on the pipe at all contact surfaces.

The disclosed tool can be used on ⅛-1 inch pipes depending upon the jaw design. The basic body of the tool remains basically and therefore, the body of the tools will only be described in FIGS. 1 and 2 with the jaws and any alternate embodiments being described individually.

It will be obvious to those skilled in the art that if the body of the tool is made larger or smaller, the dimensions of all interacting parts must be resized accordingly.

The primary description herein is the removal of the connectors from the pipe. However, the tool can also be used to place pipe into the connector in hard to reach areas. By simply reversing the tool the gripper portion moves the pipe to toward the connector when compressed. This is extremely valuable when the pipes are in difficult to reach places as the design of the handles provides an extension to the user's hand.

Figure 1:
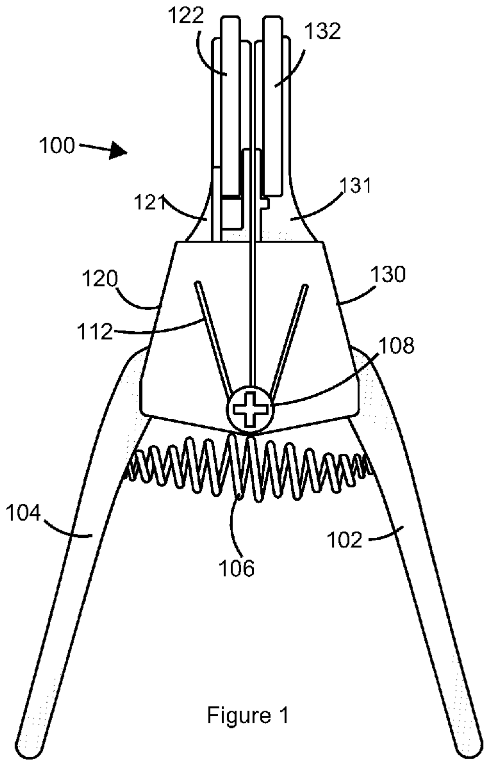
FIG. 1 is a front view of the quick release tool in accordance with the present invention.

FIG. 1 is a front view of the quick release tool 100 while FIG. 2 illustrates the back of the tool 100. The tool 100 includes a pair of handles 102 and 104 that at least one handle is movable relative to the other, and are biased by the spring 106, maintaining them in the spread a part position during non-use.

The upper section of the tool 100 is divided into a gripping portion 121 and a pusher portion 131 and form the upper portion of the frame elements 120 and 130. The frame elements 120 and 130 are maintained in a rotational relationship with one another through the use of a pivot, or hinge, 108.

The gripping portion 121 comprises moveable gripper jaw 122 and stationary gripper jaw 124. The movement of the moveable gripper jaw 122 must be sufficient to securely grip the pipe (not shown), without creating damage, and prevent movement along the length of the pipe.

The pusher portion 131 carries the movable pusher jaw 132 and stationary pusher jaw 134. The movable pusher jaw 132 must securely contact the pipe and ring (as disclosed hereinafter) while still enabling the pusher jaws 132 and 134 to move laterally along the pipe.

The stationary pusher jaw 134 and stationary gripper jaw 124 are affixed to the pusher plate 136 and gripper plate 126 respectively that provide support and structural strength to the tool 100. Preferably they are affixed through welding or molding, however the stationary pusher jaw 134 and stationary gripper jaw 124 can be affixed to their respective plates through other means known in the art such as screws, rivets, etc.

As the handles 102 and 104 are compressed, in what could be referred to as a first stage, the movable pusher jaw 132 and movable gripper jaw 122 are closed to grip the pipe between the movable gripper jaw 122 and stationary gripper jaw 124 and the movable pusher jaw 132 and the stationary pusher jaw 134. The compression spring 112 is tensioned to maintain the pusher portion 130 and the gripper portion 120 adjacent one another with the compression of the spring 112 first translating into the gripping of the jaws as stated above. Additional compression of the handles 102 and 104, or a second stage of compression, against the resistive force of the compression spring 112, tightly grips the pipe and the pusher portion 130 moves away from the gripping portion 120, separating the connector from the pipe.

The compression spring 112 provides the pressure that translates to the functioning of the gripping portion 120 and the pusher portion 130, with the greater the tension, the faster the opening and more powerful the grip. In order to accommodate the larger diameter pipes, the tensioning spring 112 should have a minimum gauge of about 0.05 mm with about 2 mm maximum. As the tensioning spring 112 affects the strength required to close the handles 102 and 104, and too great a gauge for the spring would make the tool difficult to operate.

Although handles are illustrated in conjunction with the embodiments herein, it should be noted that other means for activating the jaws, as well as other handle designs, can be used. Additionally, the springs that apply pressure to any portion of the tool can be replaced with pneumatics when or other device to apply pressure.

Figure 3:
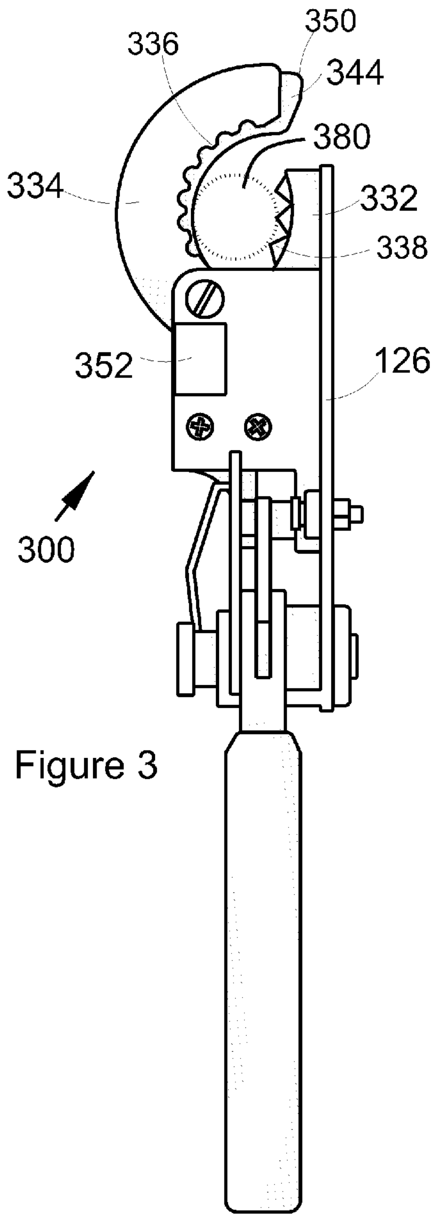
FIG. 3 is a side view of the gripper jaws of the large quick release tool, in accordance with the present invention
Figure 4:
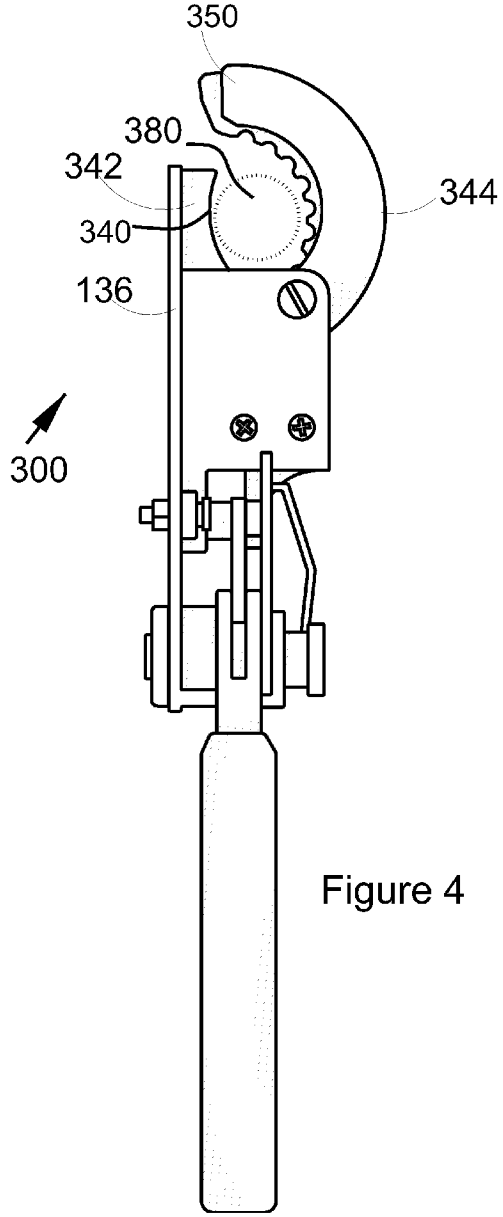
FIG. 4 is a side view of the pusher jaws of large quick release tool, in accordance with the present invention.

In FIGS. 3 and 4, the 1 inch gripping tool 300 is illustrated, more clearly showing relationship between the moveable gripper jaw 334 and stationary gripper jaw 332. In order to firmly grip the pipe 380, both the movable gripper jaw 334 and stationary gripper jaw 332 are provided with a gripping surface 336 and 338. As can be seen in FIG. 3, the stationary gripper jaw 332 is affixed to the gripper plate 126 that provides the rigidity and support. The release button 352 is approximate the movable gripper jaw 334 and serves to release the movable gripper jaw 334 from its closed, or storage, position in order to receive the pipe. The release button 352 and its mechanism are described in more detail hereinafter.

The teeth 330 of the stationary gripper jaw 332 must not extend beyond the arc 340 of the stationary pusher jaw 342. An unevenness between the two causes the stationary pusher jaw 342 to jump the thin connector ring 384 (FIG. 5), thereby either making the removal of the connector more difficult or impossible. The variance between the outer most point of the teeth 338 and the arch 340 has a tolerance of about 1/16 inch, and preferably less.

In these figures the gripping surface 336 is slight rounded. This is one embodiment of gripping surface and will work with softer pipe, such as PVC. However, if the tool is being used with metal pipe, a sharper surface, such as multiple pyramids or pointed ridges, such as illustrated with the stationary gripper jaw 332, is preferred.

The movable pusher jaw 344 and stationary pusher jaw 342 are also illustrated with the stationary pusher jaw 342 attached to, or extending from the pusher plate 136 The movable pusher jaw 344 is dimensioned to receive the pipe adjacent the connector. In order to facilitate receiving the pipe, the tip 350 of the movable pusher jaw 344 is angled, thereby preventing the pipe 380 from catching on the pusher jaw 344.

The stationary pusher jaw 342 and the stationary gripper jaw 332 are illustrated herein as having an arc, however it should be noted that the stationary gripper jaw 332 can be flat, convex or concave as long as it has a biting point that will grip the pipe that does not extend beyond the surface of the stationary pusher jaw 342. As stated heretofore the body of the tool, handle and opening mechanism, is described in conjunction with FIGS. 1 and 2.

Figure 5:
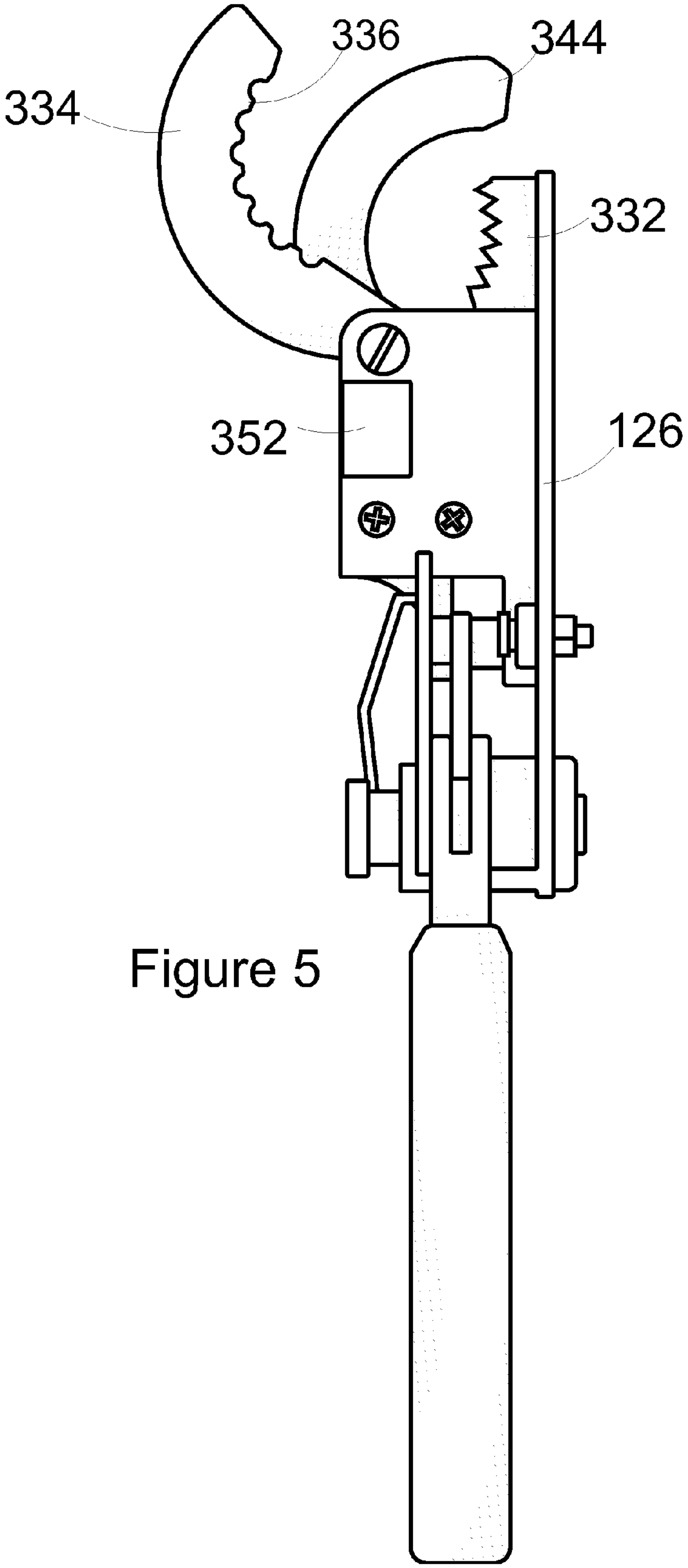
FIG. 5 is a side view of the large quick release tool with the gripper jaw in the open position, in accordance with the present invention.
Figure 6:
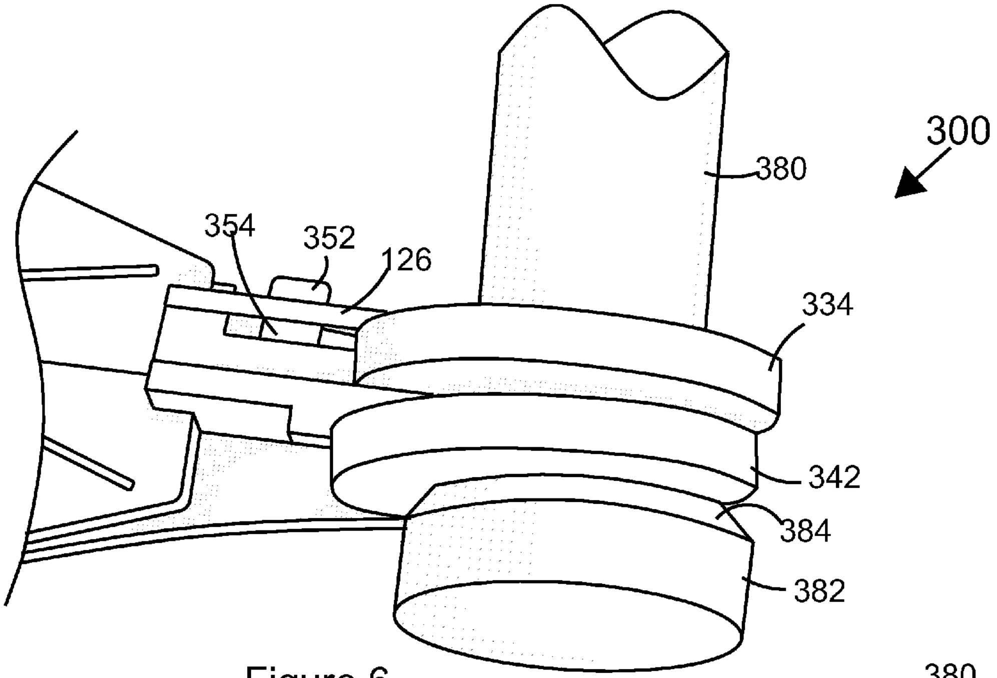
FIG. 6 is a perspective side view of the release tool gripping a pipe and coupling prior to separation, in accordance with the present invention.
Figure 7:
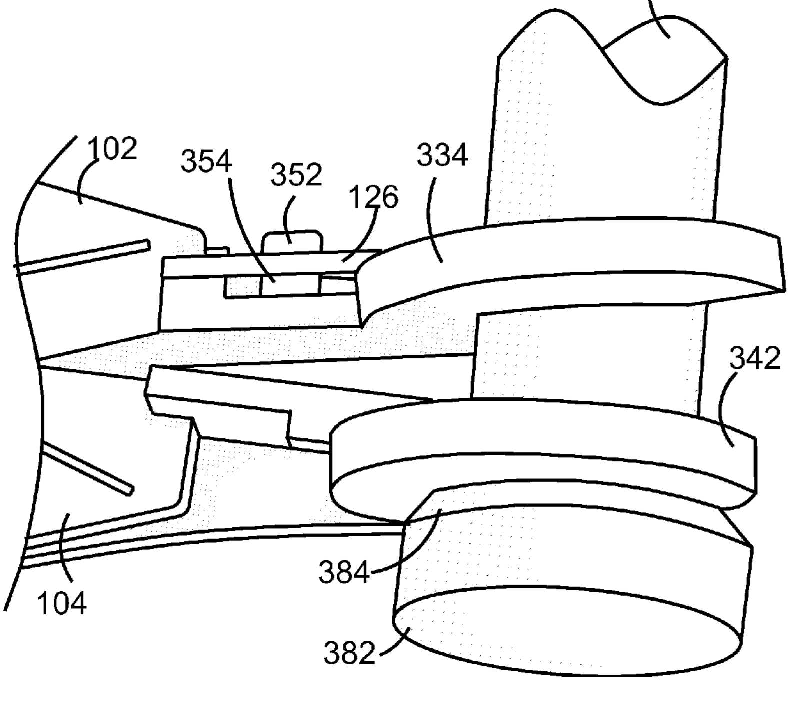
FIG. 7 is a perspective side view of the release tool gripping a pipe and coupling during separation, in accordance with the present invention.

In FIG. 5 the release button 352 has been moved to release the movable gripper jaw 334 to receive the pipe 380 (FIGS. 6 and 7). The movable pusher jaw 344 is maintained in position by a spring (as described hereinafter) and will move to receive the pipe 380 upon contact pressure.

Many connectors 382, especially at the larger diameters, are provided with a ring 384 adjacent to the pipe 380 to provide a better seal. This ring 384 must be contacted with even pressure in order enable the removal of the connector 382.

In FIG. 6 the stationary gripping jaw 334 and stationary pusher jaw 332 (both not shown) are placed in contact with the pipe 380, connector 382 and ring 384 that lies adjacent to the connector 382. In this in initial position the stationary gripping jaw 332 and movable gripping jaw 334 are adjacent to the movable pusher jaw 344 and the stationary pusher jaw 342. In FIG. 7, the user has squeezed the handles 102 and 104, thereby causing the stationary pusher jaw 342 and movable pusher jaw 344 to move away from the stationary gripper jaw 332 and movable gripper jaw 334. As the pipe 380 cannot move due to the gripping surface 336, the pressure being applied to the connector ring 384 and connector 382, forces the connector 382 and ring 384 off the end of the pipe.

The release button connector 354 can be seen in this figure extending from the release button 352 through the gripper plate 126. The release button 352 mechanism is described in detail hereinafter.

Figure 8:
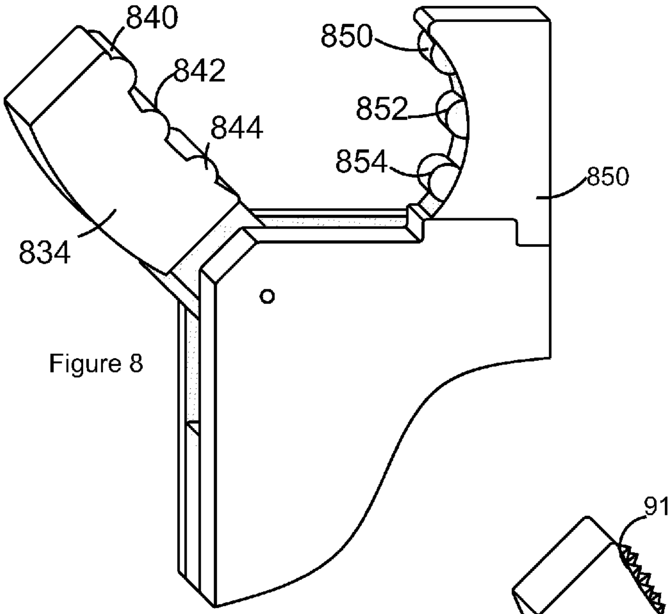
FIG. 8 is a perspective side view of the gripping portion of the quick release tool having ridges for gripping, in accordance with the presentation invention.
Figure 9:
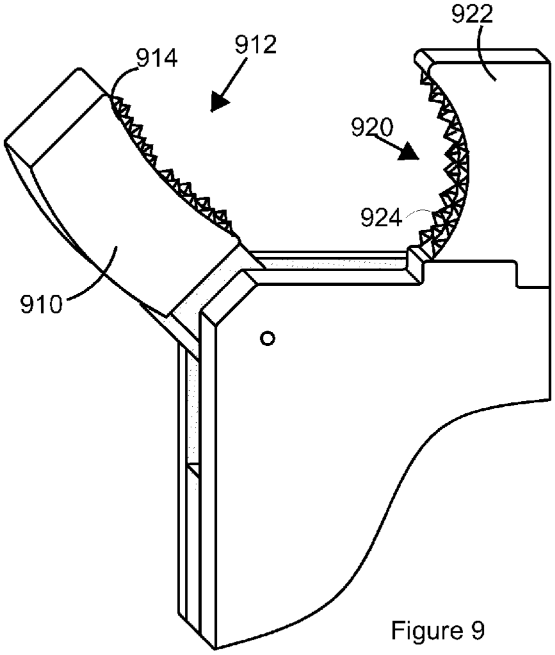
FIG. 9 is a perspective side view of the gripping portion of the quick release tool having teeth for gripping, in accordance with the presentation invention.

In FIGS. 8 and 9 two example of gripping surfaces are illustrated. In FIG. 8 the movable gripper jaw 834 and stationary gripper jaw 850 each have three ridges 840, 842 and 844 and 850, 852 and 854 respectively. These ridges 840, 842, 844, 850, 852 and 854 can be any shape that will enable the ridges 840, 842 and 844 to grip and bite into the pipe. The shape of the ridges 840, 842 and 844 and 850, 852 and 854 as well as their material of manufacture will be determined by the material of the pipe. In FIG. 9, the gripping surface 912 of the movable gripper jaw 910 and gripping surface 920 of the stationary gripper jaw 922 have multiple diamond or pyramid shaped teeth 914 and 924 respectively. For optimal grip, the teeth should be in the range of about 0.5 mm to about 1.25 mm and have a width in the range of about 5 mm to about 1.25 mm, although the ratios can vary. It is preferred that the teeth 914 and 924 be alternated in a diamond pattern, staggered along the gripping surface 912 and 920 of the movable gripper jaw 910 and stationary gripper jaw 922. Alternatively the teeth can be placed in two or more columns, generally with a maximum of six (6) teeth in each column. As with the ridges, the teeth must be able to firmly grip the surface of the pipe to prevent movement. Additionally, it should be noted that the ridges and teeth can be mixed, for example the stationary gripper jaw can have ridges while the movable gripper jaw has teeth, or vise versa.

In some applications, the gripping surface can be a natural or synthetic substance, for example rubber, epoxy, or polyurethane, that can prevent the gripper jaws from slipping on the pipe. It will be known to those skilled in the art the appropriate gripping surface based upon the end use.

Figure 10:
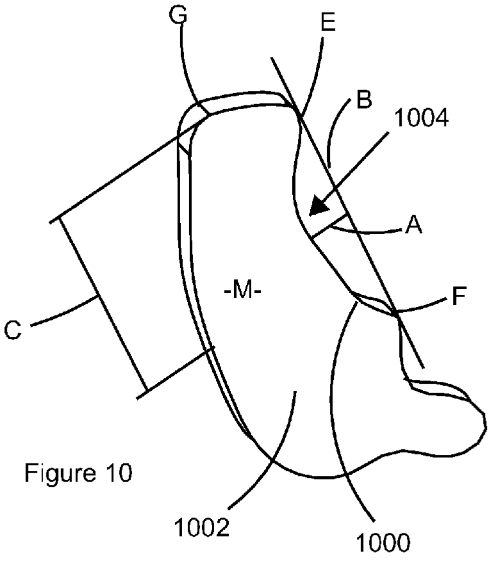
FIG. 10 is a perspective side view of the movable pusher jaw in accordance with the present invention.

In FIG. 10, the arc 1000 of the movable gripper jaw 1002 must be such that at least 10%, and preferably at least 50%, of the gripping surface 1004 makes contact with the pipe. To achieve this, the arc 1000 extends from the proximal point F to the distal point E. The distance between proximal point F to the distal point E is about 20 mm to 23 mm and preferably in the about 21.5-22.5 mm range. When a line B is drawn between the proximal point F and the distal point E, the minimum depth A from line B to the nadir of the arc 1000 is in the range of about 2 mm to about 6 mm and preferably 4 mm. The placement of the minimum depth A along the arc 1000 is determined by measuring 14 mm along inset line C from the distal end G of the gripper jaw 1002 or 10.5 to 11 from distal E to A. The foregoing optimal measurements can be varied by up to about 50%, but preferably 25% or less as the greater the deviation from preferred dimensions, the greater the reduction of reliability.

While it is preferable that the width of the gripping surface 1004 fully contacts the pipe in order to provide the appropriate grip on the pipe, it is not necessary. It is important that a sufficient portion of the gripping surface 1004 contact the pipe to hold the pipe surface firmly and prevent slippage. For optimum gripping, the minimum depth A is the same on gripper side M as it is on the opposing gripper side N (not shown). In other words, each side of the movable gripper jaw is preferably the same as the opposing side so that both edges between the gripper side M and gripper side N and the gripping surface 1004, or arc to side transition points, contact the surface of the pipe simultaneously.

To prevent torquing and to obtain the optimal results, the sides of the movable gripper jaw, stationary gripper jaw, movable pusher jaw and stationary pusher jaw are, as described above.

In most uses, the arc 1000 between distal point E and minimum depth A and minimum depth A and proximal point F will be generally equal, however it is not necessary that they be mirror images. In some applications, having distinctly different arcs can be advantageous and will be known to those skilled in the art. The arc 1000 preferably has sufficient contact to enable the contact surface 1004 to firmly grip the pipe.

Figure 11:
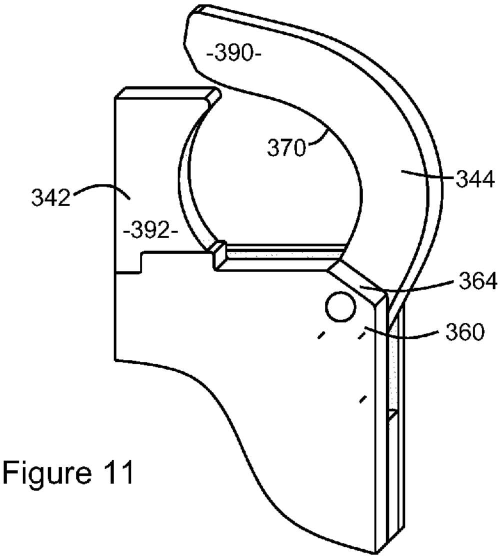
FIG. 11 is a perspective side view of the gripping portion of the quick release tool in accordance with the presentation invention.

In order to ensure that the connectors 382 are removed reliably and to eliminate damage to the ring 384, the brace 360 of the movable pusher jaw 344, as illustrated in FIG. 11, has an arc or cutback area 364 that is dimensioned to clear the ring 384. The arc 370 of the movable pusher jaw 344 applies an even pressure to the ring 384 in order to facilitate smooth removal. If the brace 360 is not cut back a sufficient amount of avoid contact with the pipe, uneven pressure will be applied, potentially causing the movable pusher jaw 344 to jump over the ring 384 and the connector 382 may not be removed. The brace 360 can be angled or arced to avoid any contact the with ring 384 and the design preference would be dependent upon the manufacturer.

In addition to the movable pusher jaw 344 having an arc 370 that enables at least 10%, and preferably at least 50%, of the movable pusher jaw 344 to contact the pipe while lying adjacent to the ring 384, the outer face 390 of the movable pusher jaw 344 must be on the same plane as the outer face 392 of the stationary pusher jaw 342. If the two faces 390 and 392 are out of alignment, the ring 384 will be contacted unevenly and the connector 382 may not be removed.

As with the movable gripper jaw 1002, it is preferable the both the leading and the trailing side of the movable pusher jaw 344 contact the pipe simultaneously. However, the connector will still be easily removed as long as the outer face 390 contacts the connector ring evenly. However, if the inner edge (not illustrated) of the movable pusher jaw 344 contacts the pipe prior to the outer face 390 contacting the pipe, the outer face will not contact the connector ring at the edge and therefore will most likely be unable to remove the connector.

Figure 12:
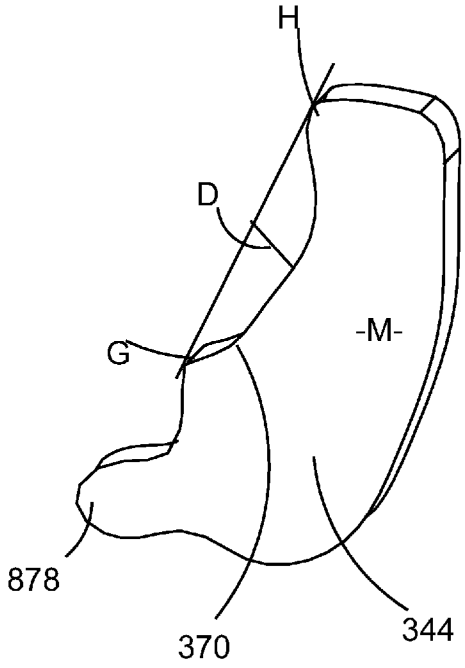
FIG. 12 is a perspective side view of the movable gripper jaw in accordance with the present invention.
Figure 18:
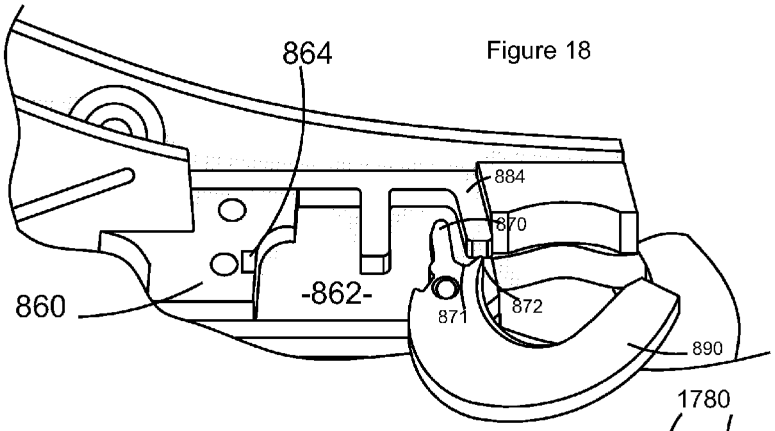
FIG. 18 is a breakaway side perspective of the movable gripper jaw placed within the E bracket of the tool, in accordance with the present invention.

To apply the required even pressure to the connector ring, the arc 370 of the moveable pusher jaw 344 width, between proximal point G and distal point H, is in the range of about 27 mm to about 30.5 mm and preferably in the range of 28 mm to 29.5 mm with a depth D in the range of about 13.5 to about 16.5 and preferably in the range of about 14.5 mm to about 15.5 mm, as illustrated in FIG. 12. It will be obvious to those skilled in the art that if the size of the pipe is increased or decreased to the point where the arc 370 movable pusher jaw 344 does not contact the pipe in a manner that permits even pressure to be applied to the connector ring, the arc dimensions must be altered accordingly. The movable pusher jaw 344, moves back freely to receive the pipe, however it is prevented from continuing backward through use of a pin 902 of FIG. 18.

Figure 13:
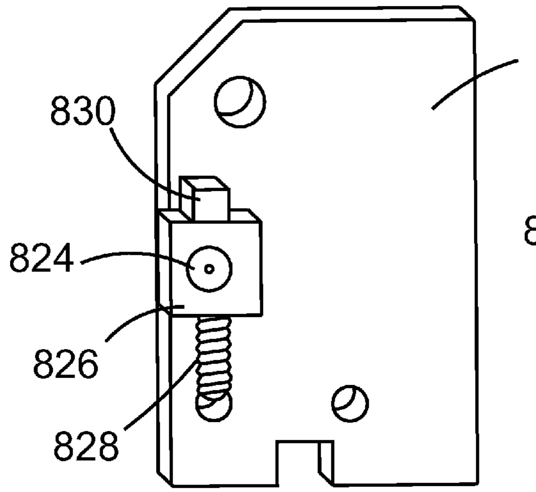
FIG. 13 is a perspective side view of the interior of the locking mechanism in accordance with the present invention.
Figure 14:
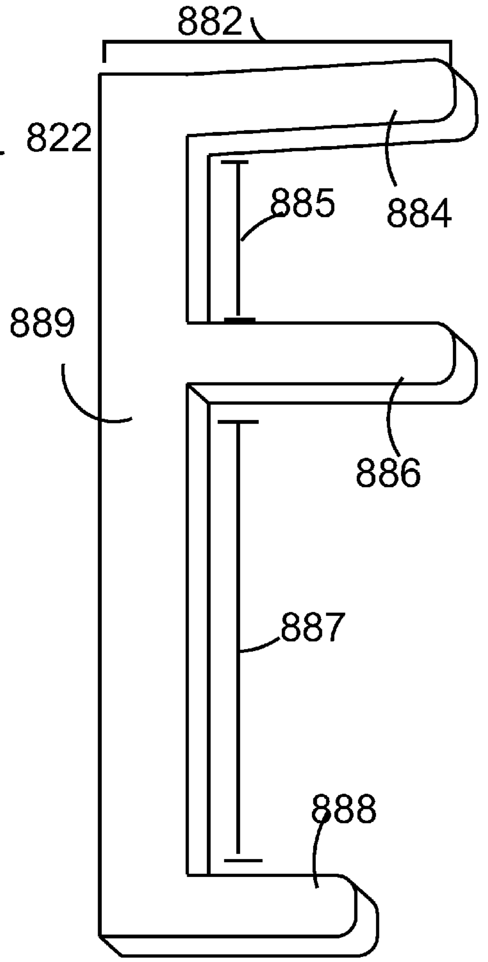
FIG. 14 is a perspective breakaway side view of the quick release tool in accordance with the present invention.
Figure 16:
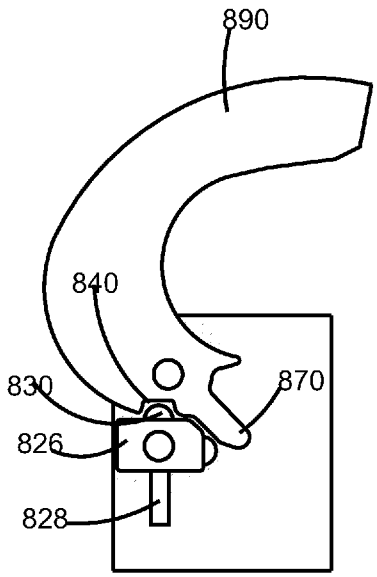
FIG. 16 is a perspective breakaway side view of the quick release tool showing the gripper jaw in the closed position, in accordance with the present invention.
Figure 17:
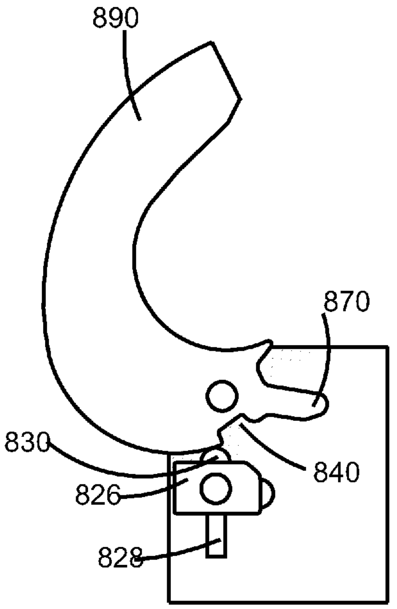
FIG. 17 is a perspective breakaway side view of the quick release tool showing the gripper jaw in the open position, in accordance with the present invention.

As illustrated heretofore, a release button 352 is used to release the movable gripper jaw 334 to enable it to extend around the pipe. The release button 352 is connected to a shaft 824 that extends through the plate 822 via a slot (not illustrated) to engage the release block 826 as illustrated in FIG. 13. The release block 826 is engaged with a spring 828 that is, at rest, pushing the block upward in the locked position. The spring 828 needs to be dimensioned to place sufficient pressure on the release block 826 to maintain the locking tab 830 in the movable gripper jaw receiving notch 840 (FIGS. 16 and 17). The spring 828 has a length in the range of about 7 mm to about 12 mm and a diameter of about 1.5 to 3 mm. Once the release button 352 is pressed down, the spring 828 is compressed, enabling the locking tab 830 to be moved from the notch 840.

The exact dimensions, both length and diameter, as well as the tensile strength, are dependent upon the size and type of the pipe being used and will be known to those skilled in the art.

In order for the plate 822 to remain solidly attached to the brace plate 860, only separated by the depth of the E plate 880, a recessed portion 862 of the brace plate 860 is provided with a depth sufficient to receive the spring 828 and release block 826. Additionally, a receiving hole 864 is placed in the brace plate 860 to receive the end of the spring 828. It will be obvious to those skilled in the art that the depth of the recessed portion 828 must accommodate the release block 826 and that varying the depth of the release block 826 will require a variance in the depth of the recessed portion 828.

It should be noted that although a spring mechanism is used to release the movable gripper jaw, any type of release and relock mechanism can be used and alternate designs will be known to those skilled in the art.

Figure 15:
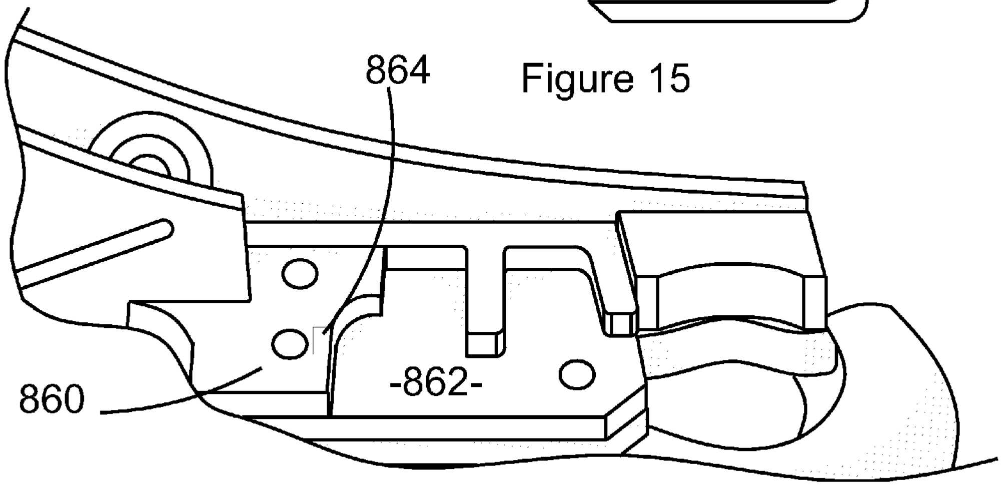
FIG. 15 is a perspective side view of the E plate in accordance with the present invention.
Figure 20:
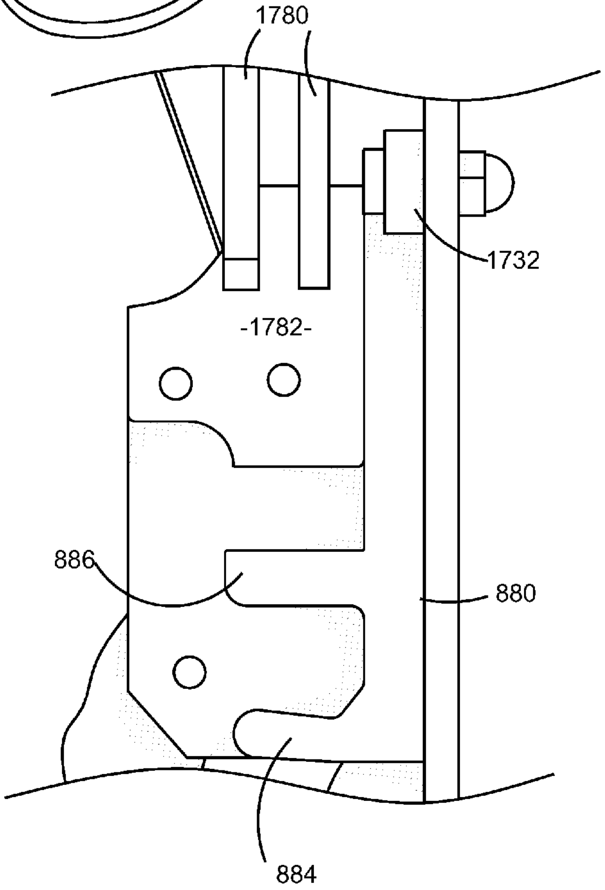
FIG. 20 is a top breakaway view of the E bracket placed within the tool in accordance with the present invention.
Figure 21:
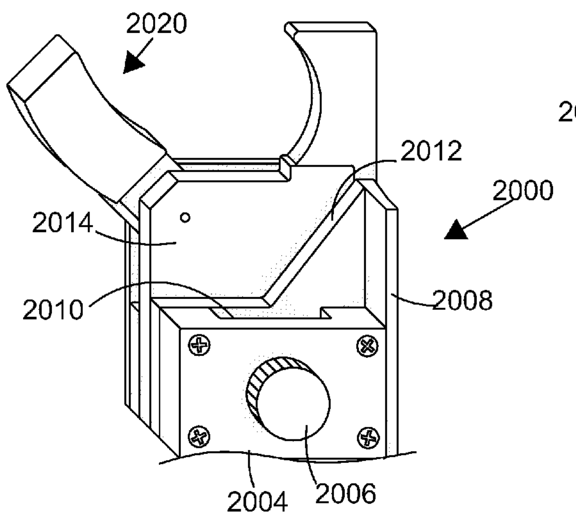
FIG. 21 is a perspective side view of an alternate embodiment of the tool incorporating a removable gripper jaw, illustrated without the removable gripper jaw accordance with the present invention.
Figure 22:
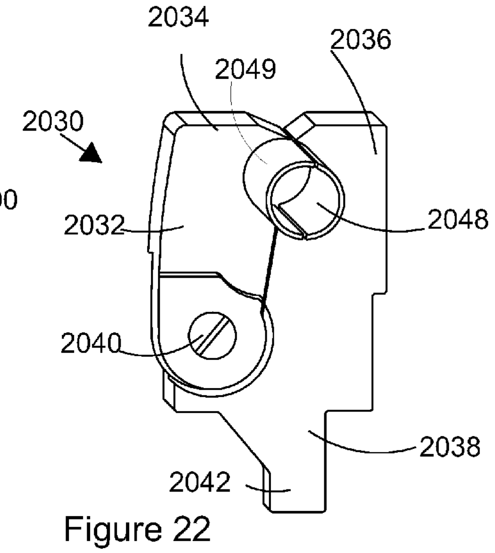
FIG. 22 is a perspective side view of the removable jaw to be used with the tool of FIG. 21, in accordance with the present invention.
Figure 23:
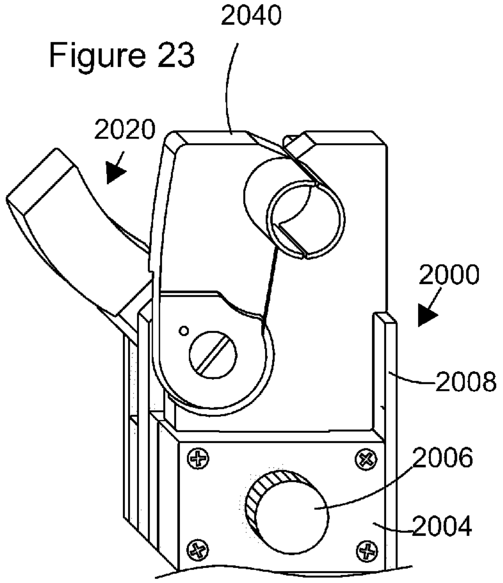
FIG. 23 is a perspective side view of the too of FIG. 21 with the removable jaw inserted in accordance with the present invention.
Figure 28:
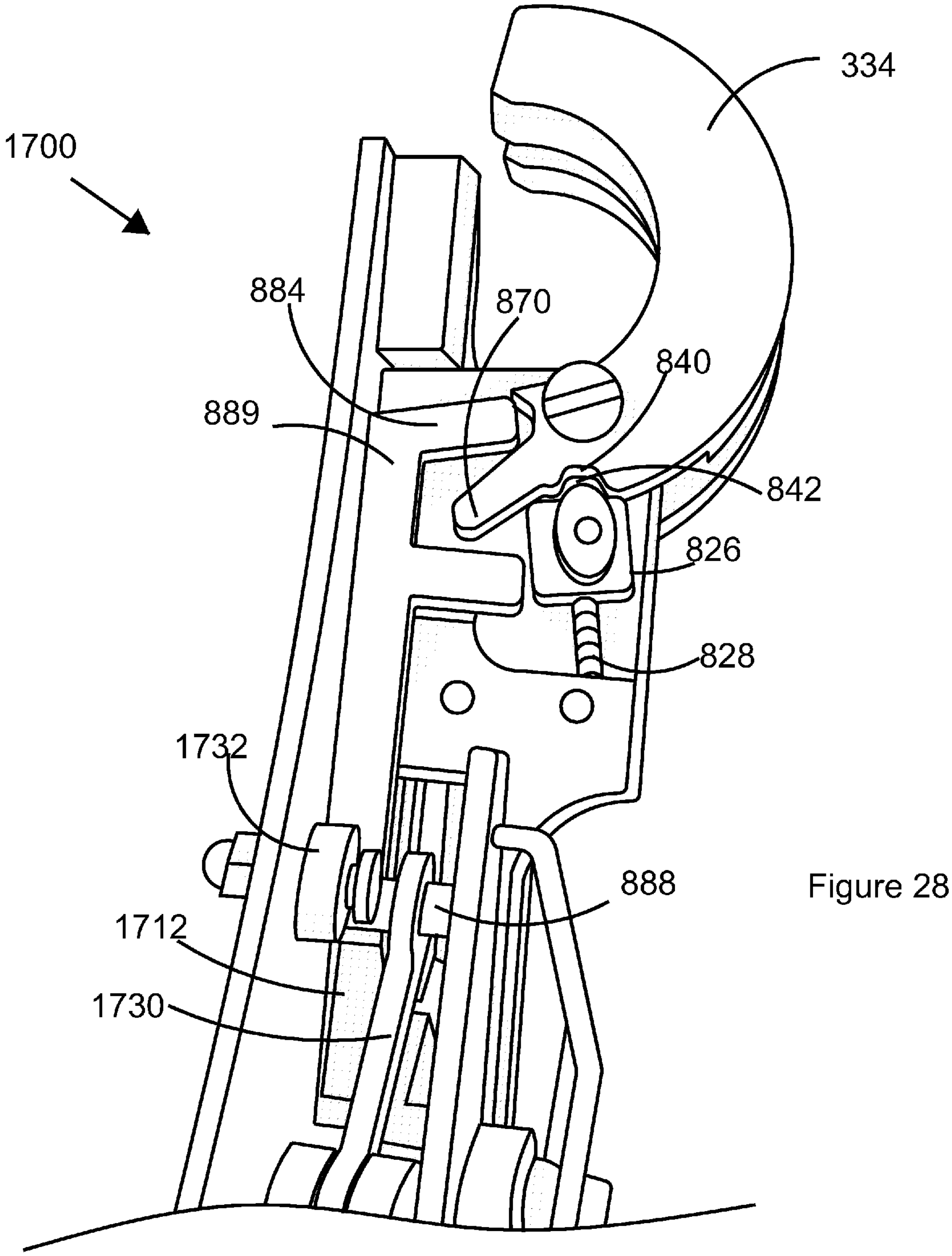
FIG. 28 is a perspective view of the interior of the gripper portion of the tool in accordance with the present invention.

The E plate 880, illustrated within the tool in FIGS. 14, 18, 20 and 28 and individually in FIG. 15, is dimensioned to receive the gripper tab 870. The gripper tab 870 fits within the E plate 880 between the upper extension 884 and the middle extension 886. The bottom bar extension 888 is connected to the handle 104 through connector 1730 as illustrated in FIG. 28. In FIG. 20, the connector 1780 is connected to a plate 1782 that is connected to the bottom bar extension (not illustrated in FIG. 20). As the handles 102 and 104 are angles, the connection members 1730 and 1780 would, without a guide, pull the bottom bar extension 888 at an angle. In order to enable the E plate 880 to be pulled directly down, a guide is incorporated to place the connection in direct line with the E plate 880. The placement of the guide 1732 is best seen in FIGS. 20 and 28. Although only one handle 104 is described herein as moving, it should be noted that both handles can move. However, the E plate 880 would continue to interact with whatever handle is controlling the movable gripper jaw.

The guide can be a channel, ball bearing, tab or other means to prevent the E plate 880 from twisting. The connection member 1002 can be a wire or bar and will be known to those skilled in the art.

The top bar 882 of the E plate 880 has a length in the range of about 10 mm to 17 mm, although the preferred length is about 14 mm. The top bar extension 884, as well as the mid bar extension 886 are in the range of about 8 mm to about 12 mm, with a preferred length of 9 mm. The distance between the top bar extension 884 and the mid bar extension 886 is in the range of about 8 mm to about 18 mm with a preferred distance of about 10 mm. The length of the spine 889 of the E plate 880 is in the range of about 42 to about 48 preferably 46 mm with the bottom extension 888 being at least 6 mm, and preferably about 10 mm. The bottom extension 888 serves as the attachment point for the connection between the handles 102 and 104 and the gripper and pusher jaws.

To close the movable gripper jaw 889 once the connector has been removed, the user squeezes the handles 102 and 104, thereby locking the movable gripper jaw 889 in the closed position.

Figure 19:
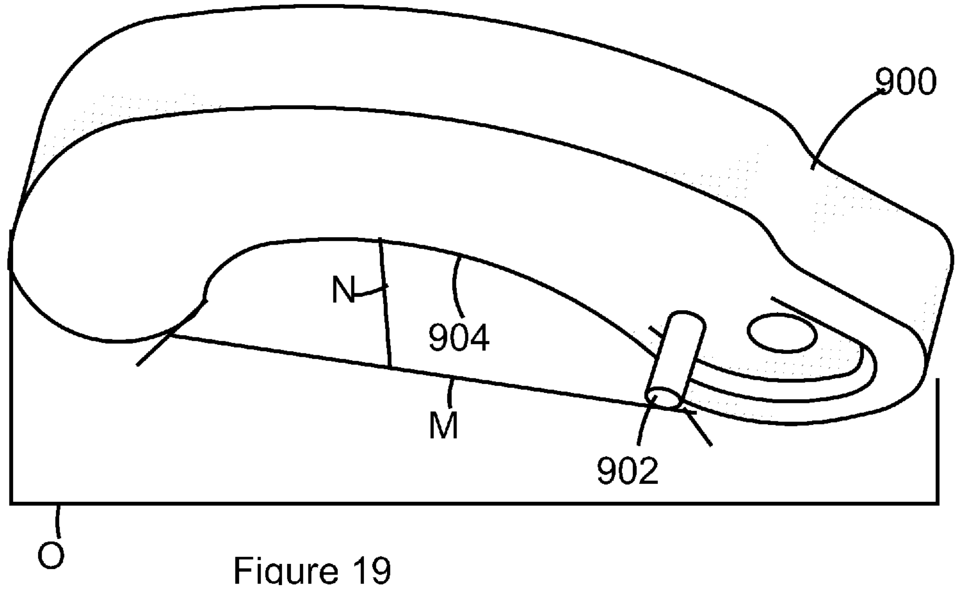
FIG. 19 is a perspective view of the movable pusher jaw in accordance with the present invention

The movable pusher jaw 900, as illustrated in FIG. 19, as stated heretofore, free to rotate within the pusher portion 130. To prevent the movable pusher jaw 900 from rotating until it comes in contact with the body of the pusher portion 130, a stop pin 902 is used. The stop pin 902 as illustrated contacts a stop within the tool that can be through any design that will engage the stop pin 902. In other embodiments, the stop pin 902 could be positioned so that it contacts a stop on the outside of the tool. An example of another stop that would be a lip or ledge on the movable pusher that would contact the stationary pusher at a certain point and serve to stop rotation. Other methods of stopping the movable pusher will be evident to those skilled in the mechanical arts The arc 904 of the movable pusher jaw 900 is, as with the movable gripper jaw, a factor in removing the connector. Preferably the arc 904 has a width M, end to end, of about 14.5 to 15.5 mm and a depth N of about 15 mm. The overall length O of the movable pusher jaw 900 is about 28 to 29.5 mm.

Figure 24:
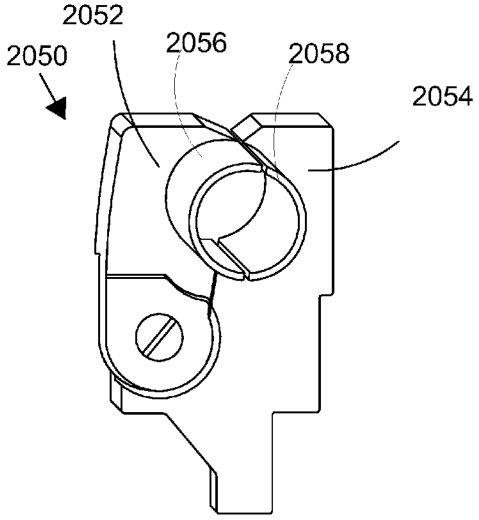
FIG. 24 is a perspective side view of an alternate removable jaw in accordance with the present invention.

In FIGS. 21-24, the pusher unit 2000 has removable jaws 2030 (FIG. 22) and 2050 (FIG. 24). The gripper unit 2020 comprises a movable gripper jaw and a stationary gripper jaw as described heretofore. The pusher receiving unit 2000 has a back wall 2008 that is a continuation of the back wall of the tool. A knob 2006 is located on the outside of the side plate 2004 and connected to a shaft that extends through the side plate 2004 into the receiving area 2010. The receiving area 2010 is spaced from the gripper side plate 2014 by shelf 2012.

The removable jaw 2030 has a rotating jaw 2032 that rotates at pivot 2040 to separate the rotating pusher 2034 from the stationary pusher 2036. The stationary pusher 2036 is part of the stationary base 2038 that is configured to fit within the pusher unit 2000. The periphery of the removable jaw 2030 should be such that it forms a close fit within the interior of the receiving area 2010, shelf 2012 and back wall 2008. The leg 2042 of the removable jaw 2030 should be dimensioned to be a friction fit within the receiving area 2010 to enable the shaft to engage force the leg 2042 tightly against the shelf 2012 when the knob 2006 is tightened.

In this embodiment, stationary pusher 2036 has an extension 2048 and the rotating pusher 2034 has a mirror extension 2049. The extensions 2048 and 2049 can be dimensioned fit the appropriate end use. One examples of use for the aforenoted embodiment would be to access the release spring in a fuel filter in designs where the fuel line is locked in position on the fuel filter by a recessed retaining spring. This design is known in the fuel filter art. Another use would be to access the recessed release ring connector design as used in Europe. Europe has two types of connectors being used, one with prongs along the outer rim and one with the recessed release ring. In both designs, releasing the connector requires pressure to be applied to a recessed portion of the connection that is readily accessible through use of the disclosed tool.

Figure 32:
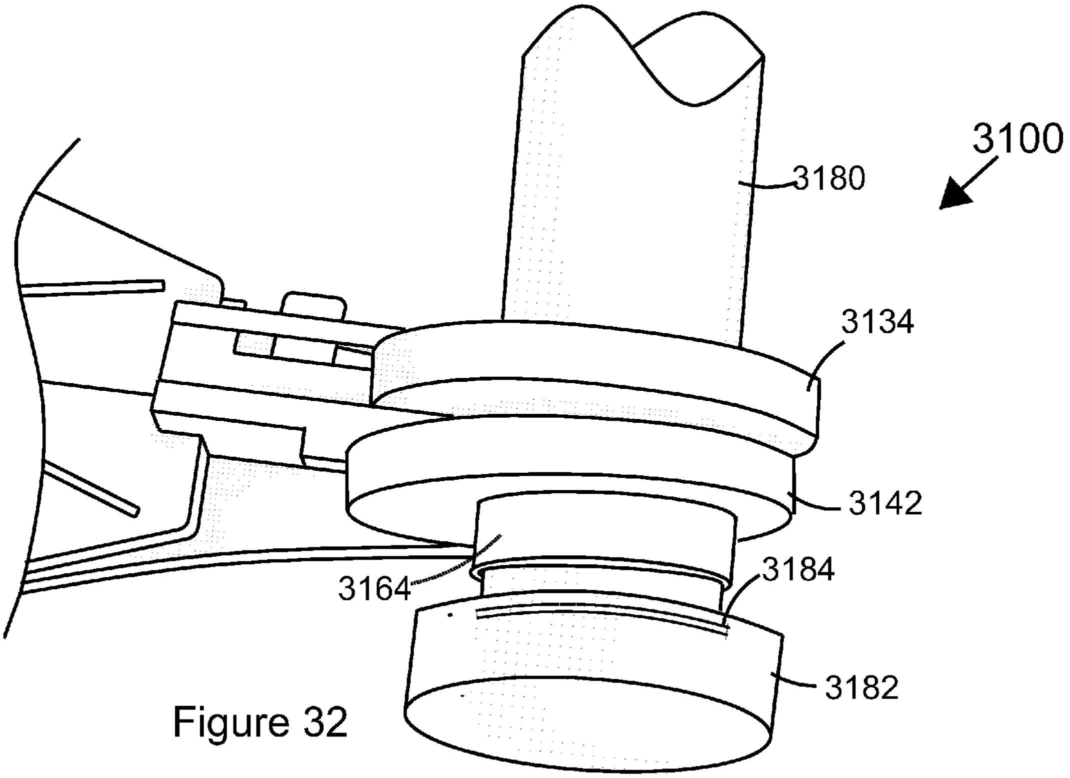
FIG. 32 is an alternate embodiment illustrating the pusher jaw having an extension to contact recessed rings in accordance with the present invention.

It should also be noted that the extension can be incorporated on the tool as described in FIGS. 1-20 and illustrated in FIG. 32 wherein the tool 3100 is illustrated with the movable gripper jaw 3134 and movable pusher jaw 3142 gripping the pipe 3180. The extension 3164 is dimensioned to contact the recessed ring 3184 within the connector 3182.

The removable jaw 2050 is the same design as removable jaw 2030, with the variation being in the diameter of the extension 2056 of the movable pusher jaw 2052 and extension 2058 of the stationary pusher jaw 2054. As with the other embodiments, and described heretofore, the surfaces of the pusher jaws must have full, flat surface contact with the line or pipe and the teeth of the gripper jaws must not extend beyond the pusher jaws.

As noted above, the embodiments illustrated in FIGS. 22-24 have the extensions to access recessed rings, however the removable jaws 2050 and 2030 can be designed without the extensions as noted in prior embodiments.

Figure 25:
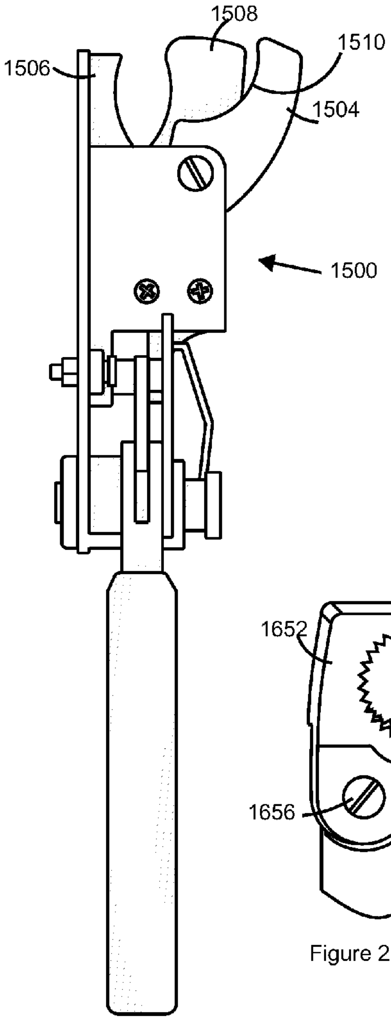
FIG. 25 is a side view of an alternate embodiment of the tool for use with mid-sized pipes in accordance with the present invention.

As stated heretofore, the handles and body of the tool can remain the same, with the jaws changing. As illustrated in FIG. 25 in tool 1500 the pipe removal portion is comprised of the movable gripper jaw 1504, stationary gripper jaw 1506, movable pusher jaw 1508 and pusher stationary jaw (not illustrated). The tool 1500 has the basic construction of the above described tool, however, as the arc 1510 is grip pipes between ⅜ to ¾ inch to remove the couplings and, due to the smaller size, the release button is not required. The depth arc 1510 on movable gripper jaw 1504 is required to enable the single tool to be use on such a large range of pipe sizes and should have a depth of about 2 mm to about 6 mm, and preferably about 4 mm. The length of the arc 1510, distance between R and S, needs to be sufficient to extend on either side of the largest pipe within the applicable range of use. For example, in the tool 1500, the size range of use is between ⅜ and ¾ of an inch with the approximate contact between the movable gripper jaw 1504 and the pipe being 10% for use with ⅜ inch; ½ and ¾ inch.

The depth dimension on the embodiment in FIG. 25 can be varied up to about 30%, however too much variation negates the ability to handle the larger range of pipe sizes.

SV

Figure 27:
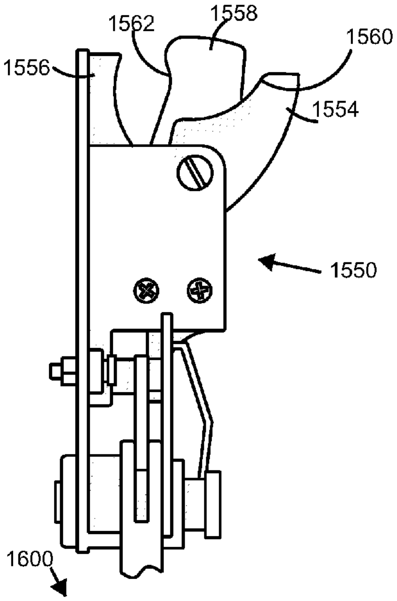
FIG. 27 is a side view of another embodiment of the tool for use with smaller pipes in accordance with the present invention.

In FIG. 27, the smallest of the disclosed embodiments, the tool 1550 again comprises the movable gripper jaw 1554, stationary gripper jaw 1556, movable pusher jaw 1558 and stationary pusher jaw (not illustrated). As seen herein, the arc 1560 of the movable gripper arm 1554 and arc 1562 of the movable pusher jaw 1558 are much shallower than in prior embodiments. The tool 1550 is used in conduits having a diameter of between ⅛ and ⅜ inch. The arc 1560 of the movable gripper jaw 1554 can have a depth from flat to about 3 mm; a depth greater than 3 mm will prevent the movable gripper jaw 1554 from contacting the ⅛ in pipe. As discussed with respect to the arch 1510 must be sufficient to span the largest pipe in the applicable range of use, in this embodiment ⅜ inch.

In FIG. 28 the interior of the gripper side of the tool 1700 capable of handling the 1 inch pipe is illustrated. It should be noted that although some elements, such as the release mechanism 826 and spring 828, are not required in all sizes, the basic construction and transfer of force.

In this figure the movable gripper jaw 334 is in the closed position. As can be seen, the spring 828 is pushing the release block 826 upward to maintain the tab 842 in the tab receiving notch 840. Upon release of the locking button the movable gripper jaw 334 swings backward until the tab 870 comes in contact with the top bar extension 884.

As noted heretofore, the E plate 889 used in all size tools is subjected to force at about a 45 degree angle through connector rod 1730 as the handles are squeezed. Due to the angle, the bottom extension 888 of the E plate 889 is pulled outward at the angle matching that of the connector rod 1730. This can eventually bend the E plate 889 and cause the tool to be inoperable. In order to prevent the E plate 889 from bending, a guide 1732 is placed approximate the base bottom extension 888. As the handles are compressed, pulling the connector rod 1730 downward, the E plate 889 is slid downward between the guide 1732 and the back plate 1712, thereby prevent the E plate 889 from buckling.

Although the guide 1732 as illustrated in this embodiment is a roller, any alternate member can be used to retain the E plate 889. The important feature is for the guide 1732 to be spaced from the back plate 1712 slightly more than the thickness of the E plate 889. This prevents any bending of the E plate 889 as it is fully supported on both sides while still enabling the E plate 889 to slide. Alternatively a channel can be used in the body to prevent the E plate from twisting. Other retaining members and methods will be evident as long as the E plate is prevented from twisting while being permitted to slide.

Figure 29:
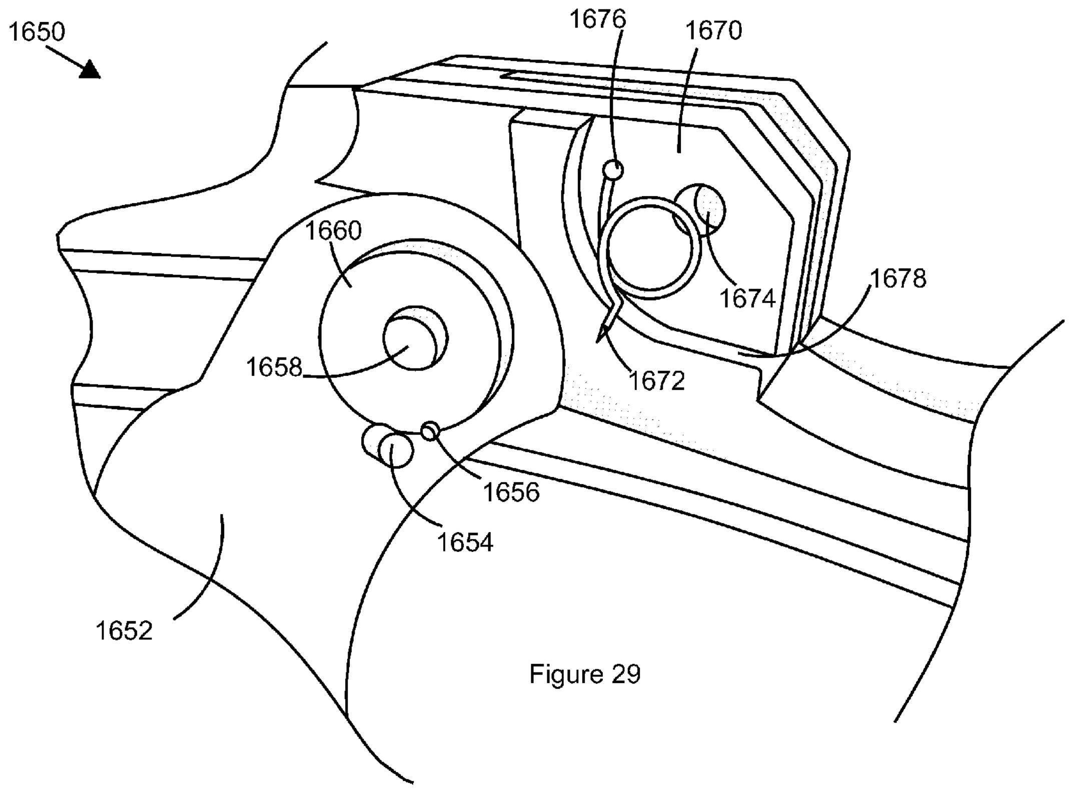
FIG. 29 is a cutaway perspective view of the interior of the movable pusher jaw element of the tool in accordance with the present invention.

The rotating pusher jaw 1652, as mentioned heretofore, rotates freely in all embodiments. As with the E plate described in FIG. 28, the rotating pusher jaw 1652 described in FIG. 29, can eliminate some elements in the smaller sizes.

The rotating pusher jaw 1652 has a disc 1660 that extends from the interior surface of the rotating pusher jaw 1652. Extending from the disc 1660 is a pivot 1658 at approximately the center point. At one edge of the disc 1660 is a pusher receiving hole 1656 to receive the end of the spring 1672.

In the tool 1650 an arc 1678 is either molded or milled and is dimensioned to receive the disc 1660 of the rotating pusher jaw 1652. The back plate 1670 of the tool 1650 contains a receiving hole 1674 dimensioned to receive the pivot 1658. The spring 1672, has one end secured in the spring receiving hole 1676 while the other end is placed in the pusher receiving hole 1656. The spring 1672 is, at rest, maintaining the rotating pusher jaw 1652 in the closed position. The tension must, however, not be so great as to make it difficult for the rotating pusher jaw 1652 to open when placed against the pipe.

To limit the swing of the rotating pusher jaw 1652 a stop pin 1654 is positioned to contact the body of the tool 1650. The placement of the stop pin 1654 can vary, depending upon the size of the tool, and will be known to those skilled in the art. Alternatively, other types of stops mechanisms can be used, for example a tab that extends from the bottom of the pusher jaw to interact with the back of the pusher portion, or a tab on the pusher portion that will prevent rotation of the movable pusher jaw.

Relative movement between the upper and lower gripping jaws in all embodiments enables the tool to clamp onto the pipe or conduit, whether one or both jaws move, or whether it is the upper or lower jaw that is movable. The movement of either or both jaws can be achieved in any of the methods well known in the art.

Figure 26B:
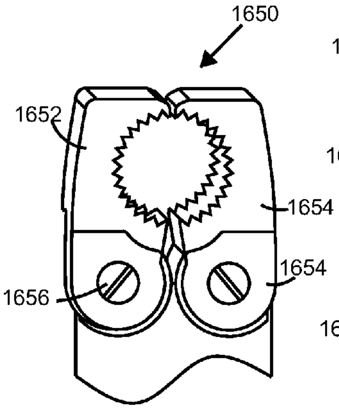
FIG. 26B is a perspective side view of the gripper section of an alternate tool have two moving jaws, in accordance with the invention.
Figure 26A:
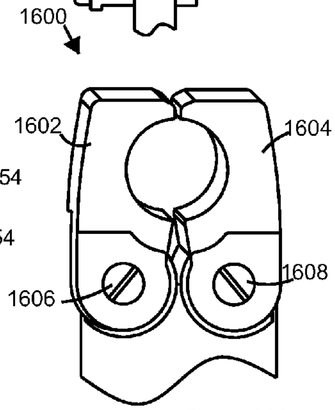
FIG. 26A is a perspective side view of the pusher section of an alternate tool have two moving jaws, in accordance with the invention.

An example of tools 1600 and 1650 having both jaws moving is illustrated in FIGS. 26A and 26B. In FIG. 26A the pusher first jaw 1602 rotates around pivot point 1606 and second pusher jaw 1604 rotates around pivot 1608, both pivots 1606 and 1608 being affixed to the body 1620. In FIG. 26B the gripper first jaw 1651 rotates around pivot point 1656 and second pusher jaw 1654 rotates around pivot 1658, both pivots 1656 and 1658 being affixed to the body 1670. The dual jaw rotation can be used on either the pusher or gripper or both.

Figure 30:
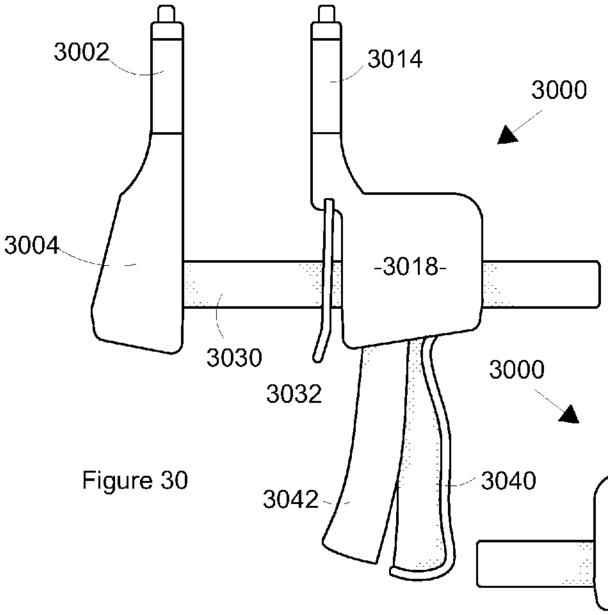
FIG. 30 is an alternate embodiment of the tool showing the stationary gripper and pusher jaws in accordance with the present invention.
Figure 31:
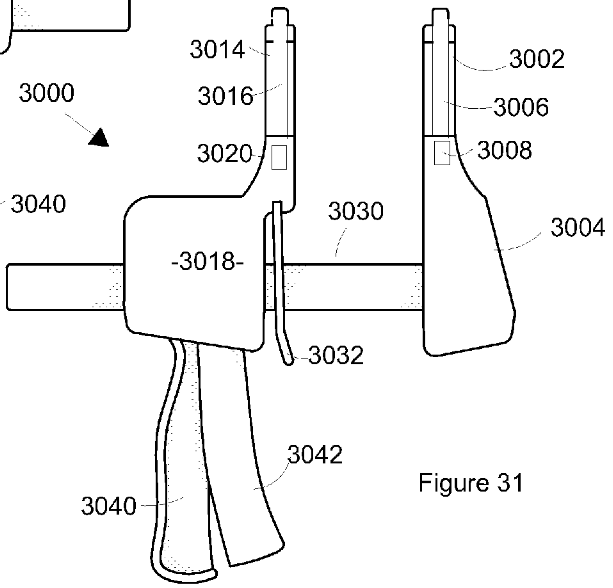
FIG. 31 is the alternate view of the tool of FIG. 30 showing the movable gripper and pusher jaws in accordance with the present invention.

In FIGS. 30 and 31 an alternate embodiment of a connector release tool 3000 is illustrated. The tool 3000 is an example of how the body and handles can be altered. Other changes to the body design will be evident to those skilled in the art after reading the disclosed.

FIG. 30 illustrates the back of the tool 3000 showing the stationary pusher jaw 3002 and stationary gripper jaw 3014. The stationary pusher jaw 3002 is, as was the prior embodiments, attached to the pusher body 3004 in a rigid manner. Similarly the stationary gripper jaw 3014 is attached to the gripper body 3018. The pusher body 3004 and the gripper body 3018 are separate units that are connected through the slide bar 3030. The pusher body 3004 remains stationary on the slide bar 3030 while the gripper body 3018 moves along the slide bar 3030 away the pusher body 3004 by squeezing the handles 3042 and 3040. The release bar 3032 releases the tension and enables the gripper body to be moved back toward the pusher body 3004.

In FIG. 31, the movable gripper jaw 3016 and the movable pusher jaw 3006 are seen in the closed position. The movable pusher jaw 3006 and the movable gripper jaw 3016 are released from and locked into a closed position through use of slide buttons 3008 and 3020. These buttons 3008 and 3020 have an interior tab that interacts with the movable pusher jaw 3006 and movable gripper jaw 3016. Alternatively the movable gripper jaw 3016 can be locked into placed upon compression of the handles 3040 and 3042 and released through use of the release bar 3032.

This stationary body on a rod also containing a movable body is known in the clamp art and covered under U.S. Pat. Nos. 5,009,134, 4,926,722, 5,222,420 and 5,022,137. The clamps however have inward facing pads and when the handles are squeezed, the two pads come together to make contact. If the portion of the claim is reversed, the stationary and movable bodies move apart, however the pad on the movable body is facing away from the pad on the stationary body. Therefore internal modification of the design must be made in order to adapt the movable gripper. The basic interior design of how the movable body moves and is locked in place, however, can be seen in the forgoing patents. Alternate means of moving and locking the movable gripper jaw can be used, such as a toothed bar and gears, and will be known in the art.

Although the foregoing illustrates represent the preferred embodiments, it should be noted that arcs as used in both the release elements and the gripping members are optional. Any of the embodiments can use all arced surfaces, all flat surfaces or a combination thereof. It is preferable that the foregoing gripping members have either teeth, such as pliers, or some type of non-slide coating that prevents the conduit from slipping. In some instances, it may be beneficial to use both the teeth and a rubber coating and the obvious use of one or the other, or a combination thereof will be obvious to those skilled in the art.

It should be noted that although the description of the action of the hand tool is described as three specific stages, in actual use the motion is smooth and sufficiently rapid to eliminate any separate, specific stages. The mechanism used to translate the movement of the handles to the gripping head, as illustrated herein, is an example of one method and different mechanical methods of translating the movement of the handles to the movement of the head will be obvious. The novelty lies in the gripping and pusher action, rather than how this action is achieved and the motion exchange from handles to air tool will be obvious to those skilled in the mechanical arts.

What is claimed is:

1. A tool for the removal of connectors from a pipe, said tool having a body, said body comprising:

a gripping portion, said gripping portion having a first end and a second end, and a pusher portion, said pusher portion having a first end and a second end and being stationary relative to said gripping portion, a pivot connection, said pivot connection to maintain said gripping portion and said pusher portion rotatably connected to each other, a pair of handles, a first of said pair of handles connected to said gripping portion second end and a second of said pair of handles connected to said pusher portion second end, a handle spring, said spring being affixed to each of said pair of handles to maintain said pair of handles at a maximum separation distance, said maximum separation distance maintaining said gripping portion first end and said pusher portion first end adjacent one another, a compression spring, said compression spring providing tension to maintain said pusher portion adjacent said gripping portion;

a gripping element, said gripping element being affixed to said gripping portion and having:

a stationary gripping jaw, said stationary gripping jaw having a gripping surface, said gripping surface being configured to contact a pipe, a movable gripping jaw, said movable gripping jaw having an arced gripping surface, said arced gripping surface being configured to contact and grip at least 10% of the surface of a pipe, said movable gripping jaw being connected to a linkage between said movable gripping jaw and said first handle, a pusher element, said pusher element being affixed to said pusher portion first end and having:

a stationary pusher jaw, said stationary pusher jaw having a stationary pusher jaw outer face surface configured to contact a connector ring, and a holding surface, said holding surface being on the same plane as said gripping surface of said stationary gripping jaw, a movable pusher jaw, said movable pusher jaw having an arced holding surface, said arced holding surface being configured to contact at least 10% of the surface of a pipe, and a movable jaw outer face surface, said movable jaw outer face surface being on a same plane as said stationary jaw outer face surface and configured to make contact with said ring of said connector, wherein at least said holding surface of said movable pusher jaw and said gripping surface of said movable gripping jaw have a hardness greater than the hardness of said pipe, said gripping element and said pusher element are positioned during initial compression of said handles to grip said pipe between said movable gripping jaw and said stationary gripping jaw and said movable pusher jaw and said stationary pusher jaw and secondary compression of said handles causes said gripping element to move away from said pusher element thereby creating distance between said gripping element and said pusher element.

2. The tool of claim 1 wherein said second handle is non-movably secured to said body.

3. The tool of claim 1 wherein said gripping surface of said movable gripper jaw has a roughened surface.

4. The tool of claim 3 wherein said roughened surface is at least one from the group comprising undulations, pointed rows, multiple randomly placed pyramids, pointed columns, natural or synthetic coatings.

5. The tool of claim 1 wherein said gripping surface of said stationary gripper jaw has a roughened surface.

6. The tool of claim 5 wherein said roughened surface is at least one from the group comprising undulations, pointed rows, multiple randomly placed pyramids, pointed columns, natural or synthetic coatings.

7. The tool of claim 1 wherein said stationary gripper jaw has an arcuate configuration.

8. The tool of claim 1 wherein said movable pusher jaw has an angled tip.

9. The tool of claim 1 further comprising a release mechanism, said release mechanism interacting with a release mechanism receiving area to release said movable gripper jaw from a closed position and relock said movable gripper jaw in said closed position.

10. The tool of claim 9 wherein said release mechanism comprises a release button, a release block and a spring, said spring to maintain said release block in a position to lock said movable gripper jaw in a locked position and to release said movable gripper jaw from said locked position upon compression of said spring.

11. The tool of claim 10 wherein said movable gripper jaw further comprises a gripper tab, said gripper tab being in movable contact with said linkage.

12. The tool of claim 11 wherein said linkage comprises an E plate, said E plate being secured within said gripping portion to slide upon compression of said pair of handles, a first end of said E plate receiving said gripper tab and a second end of said E plate receiving a connector to said first handle.

13. The tool of claim 12 further comprising a guide member, said guide member being in slidable contact with said E plate to prevent said E plate from twisting.

14. The tool of claim 13 wherein said guide member is a roller.

15. The tool of claim 1 wherein said movable pusher jaw further comprises a stop, said stop limiting rotation of said pusher jaw.

16. The tool of claim 1 wherein a connection point between said movable pusher jaw and said pusher element is dimensioned to avoid contact with a sealing ring of said connector to enable said movable pusher jaw and said stationary pusher jaw to apply even pressure to said sealing ring and said connector.

17. The tool of claim 1 wherein at least 50 percent of said gripping surface of said movable gripper jaw contacts said pipe.

18. The tool of claim 1 wherein at least 50 percent of said holding surface of said movable pusher jaw contacts said pipe.

19. The tool of claim 1 wherein said pipe has at least a 1 inch diameter.

20. The tool of claim 19 wherein said arced holding surface of said movable pusher jaw has a width in the range of about 27 mm to about 30.5 mm and preferably in the range of 28 mm to 29.5 mm and a depth in the range of about 13.5 mm to about 16.5 mm and preferably in the range of 14.5 mm to 15.5 mm.

21. The tool of claim 20 wherein said measurements can be varied by about 50%.

22. The tool of claim 19 wherein said arced gripping surface has a length of about 20 mm to 23 mm and preferably in the about 21.5-22.5 mm range and a depth in the range of about 2 mm to about 6 mm and preferably 4 mm.

23. The tool of claim 22 wherein said measurements can be varied by about 50%.

24. The tool of claim 1 wherein said pipe has a diameter less than ¾ inch.

25. The tool of claim 24 wherein said arced gripping surface of said movable gripping jaw has a length in the range of about 20 mm to about 23 mm and preferably in the range of 21.5 mm to 22.5 mm and a depth in the range of about 2 mm to about 6 mm and preferably in the range of about 4 mm.

26. The tool of claim 24 wherein said arced holding surface of said movable pusher jaw has a width slightly greater than the diameter of said pipe and a depth of about 2 mm to about 6 mm, and preferably about 4 mm.

27. The tool of claim 26 where said depth of said arced holding surface can vary up to about 30%.

28. The tool of claim 1 wherein the greater the tension created by compression of said compression spring the quicker said movable gripper jaw and said stationary pusher grip said pipe thereby increasing the pressure on said pipe prior to separation of said pusher element and said gripper element.

29. The tool of claim 1 wherein at least said gripping surface of said stationary griping jaw and said arced gripping surface of said movable gripping jaw and is manufactured from a hardened steel 440 heat treated to the heat spec of 50RWC.

30. The tool of claim 1 wherein said pusher element further comprises a stationary pusher jaw extension and a movable pusher jaw extension, said stationary pusher jaw extension and said movable pusher jaw extension extending at right angles from said stationary pusher jaw extension and said movable pusher jaw and dimensioned to contact said connector ring in connectors where said connector ring is recessed within said connector.

31. The tool of claim 1 wherein said pusher element is removably affixed to said pusher portion and said pusher portion first end further comprises a receiving area and a locking member, said receiving area being dimensioned to receive said pusher element and said locking member securing said pusher element within said receiving area.

32. The tool of claim 30 wherein said pusher element further comprises a stationary pusher jaw extension and a movable pusher jaw extension, said stationary pusher jaw extension and said movable pusher jaw extension extending at right angles from said stationary pusher jaw extension and said movable pusher jaw and dimensioned to contact said connector ring in connectors where said connector ring is recessed within said connector.

33. A tool for the removal of connectors from pipes, said tool having a body, said body comprising:

a gripping portion, said gripping portion having a first end and a second end, and a pusher portion, said pusher portion having a first end and a second end, a pair of handles, a first of said pair of handles connected to said gripping portion second end and a second of said pair of handles connected to said pusher portion second end, said second handle being stationary in relation to said pusher portion, a pivot connection, said pivot connection maintaining said gripping portion and said pusher portion rotatably connected, a spring, said spring being affixed to each of said pair of handles to maintain said pair of handles at a maximum separation distance, said maximum separation distance maintaining said gripping portion first end and said pusher portion first end adjacent one another, a compression spring, said compression spring being tensioned to maintain said gripper portion and said pusher portion adjacent one another, the greater the tension created by compression of said compression spring the quicker said movable gripper jaw grips said pipe thereby increasing the pressure on said pipe prior to separation of said pusher element and said gripper element, a gripping element, said gripping element being affixed to said gripping portion and having:

a stationary gripping jaw, said stationary gripping jaw having an arced gripping surface, said gripping surface being configured to contact and grip a pipe, and a movable gripping jaw, said movable gripping jaw having:

a gripper tab, said gripper tab being in movable contact with said linkage, an arced gripping surface, said arced gripping surface having a roughened surface with at least 10% of said roughened surface in contact with and parallel with said pipe, said movable gripping jaw being connected to a linkage between said movable gripping jaw and said first handle, a pusher element, said pusher element being affixed to said pusher portion and having:

a stationary pusher jaw, said stationary pusher jaw having a stationary jaw outer face surface, and a flat holding surface, said holding surface being parallel with said pipe and on the same plane as said gripping surface of said stationary gripping jaw, a movable pusher jaw, said movable pusher jaw having:

a flat arced holding surface being parallel with said pipe and having at least 10% of said arced gripping surface in contact with said pipe and an angled tip to receive said pipe, and a stop to limiting rotation of said pusher jaw, a spring between said rotating pusher jaw and said pusher portion, said spring returning said rotating pusher jaw to a closed position, a connection point between said movable pusher jaw and said pusher element dimensioned to avoid contact with a sealing ring of said connector, said movable jaw having an outer face surface, said movable jaw outer face surface being on a same plane as said stationary jaw outer face surface, wherein at least said gripping surface of said movable gripping jaw have a hardness greater than the hardness of said pipe and initial compression of said handles causes said gripping element and said pusher element to grip said pipe between said movable gripping jaw and stationary pusher jaw and secondary compression of said handles causes said gripping element to move away from said pusher element thereby creating distance between said gripping element and said pusher element.

34. The tool of claim 33 wherein said roughened surface is at least one from the group comprising undulations, pointed rows, multiple randomly placed pyramids, pointed columns, natural or synthetic coatings.

35. The tool of claim 33 wherein said gripping surface of said stationary gripper jaw has a roughened surface.

36. The tool of claim 33 wherein said movable gripper jaw further comprises a release mechanism receiving area and a release mechanism, said release mechanism interacting with said release mechanism receiving area to release said movable gripper jaw from a closed position and relock said movable gripper jaw in said closed position.

37. The tool of claim 36 wherein said release mechanism comprises a release button, a release block and a spring, said spring to maintain said release block in an position to lock said movable gripper jaw in a locked position and to release said movable gripper jaw from said locked position upon compression of said handles.

38. The tool of claim 33 wherein said linkage comprises a guide member and an E plate, said E plate being secured within said gripping portion to slide upon compression of said pair of handles, a first end of said E plate receiving said gripper tab and a second end of said E plate receiving a connector to said first handle, said guide member being affixed to said gripping portion to prevent said E plate from twisting.

39. The tool of claim 33 wherein said arced holding surface of said movable pusher jaw has a width in the range of about 27 mm to about 30.5 mm and preferably in the range of 28 mm to 29.5 mm and a depth in the range of about 13.5 mm to about 16.5 mm and preferably in the range of 14.5 mm to 15.5 mm.

40. The tool of claim 33 wherein said arced gripping surface of said movable gripping jaw has a width in the range of about 20 mm to about 23 mm and preferably in the range of 21.5 mm to 22.5 mm and a depth in the range of about 2 mm to about 6 mm and preferably in the range of about 4 mm.

41. A method of removing a connector from a pipe using a tool having a body comprising the steps of:

a. placing a pipe between an arced holding surface of a stationary gripping jaw and a movable gripping jaw, and a stationary pusher jaw and a movable pusher jaw, said arced holding surface being parallel with said pipe, said stationary pusher jaw having an outer surface on the same plane as said movable pusher jaw outer surface, b. compressing a pair of handles to a first point, thereby engaging a bottom bar extension linked to a first of said pair of handles to move a guide in contact with a tab extension of said movable gripper jaw, and closing said stationary gripping jaw, said movable gripping jaw, said stationary pusher jaw and said movable pusher jaw around said pipe, c. compressing said pair of handles to a second point thereby causing said stationary pusher jaw and said movable pusher jaw to move away from said stationary gripping jaw and said movable gripping jaw, d pressing said stationary pusher jaw and said arced movable pusher jaw against said connector thereby causing said connector to slide off said pipe.

42. The method of claim 41 wherein the tool has a configuration as defined in claim 1.

* * * * *